(12) United States Patent
Ashley et al.

(10) Patent No.: US 7,650,442 B2
(45) Date of Patent: Jan. 19, 2010

(54) TRANSFER OF MEDIA CONTENT FROM A PERSONAL VIDEO RECORDER TO AN EXTERNAL STORAGE DEVICE

(75) Inventors: Alexis S. R. Ashley, Redhill (GB); Jonathan G. Foster, Bradford-On-Avond (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 334 days.

(21) Appl. No.: 11/815,116

(22) PCT Filed: Feb. 1, 2006

(86) PCT No.: PCT/IB2006/050344

§ 371 (c)(1),
(2), (4) Date: Jul. 31, 2007

(87) PCT Pub. No.: WO2006/082562

PCT Pub. Date: Aug. 10, 2006

(65) Prior Publication Data

US 2008/0133781 A1    Jun. 5, 2008

(30) Foreign Application Priority Data

Feb. 4, 2005    (EP)    ................................. 05100790

(51) Int. Cl.
*G05B 15/00*    (2006.01)
(52) U.S. Cl. .............................. 710/31; 710/15; 710/36; 710/38; 710/52
(58) Field of Classification Search ................. 348/211, 348/231, 240; 370/252, 390, 401, 512; 386/125, 386/46, 52, 68, 83, 92; 710/113, 20, 309, 710/52; 711/114, 165; 725/134, 151, 25, 725/37, 39
See application file for complete search history.

(56) References Cited

U.S. PATENT DOCUMENTS

| | | | |
|---|---|---|---|
| 5,566,306 A * | 10/1996 | Ishida | 710/309 |
| 6,064,504 A | 5/2000 | Minakuchi et al. | |
| 6,961,430 B1 * | 11/2005 | Gaske et al. | 380/216 |

(Continued)

FOREIGN PATENT DOCUMENTS

EP    1376299 A2    1/2004

(Continued)

OTHER PUBLICATIONS

"DVR/PVR Refernce Design"-Document From Media Technik, LLC., Revision 1.1, Jul. 2002, pp. 1-7. Media Technik, Peterfia U. 53. Debrecen, H-4026 Hungary, WEB-HTTP://WWW.MEDIATECHNIK.COM.

*Primary Examiner*—Henry W. H. Tsai
*Assistant Examiner*—Cheng-Yuan Tseng

(57) ABSTRACT

A personal video recorder (PVR) (10) comprises a receiving stage (12) which receives media content and an internal storage device (24) such as a hard-disk. The PVR has an interface (26) for connecting to an external storage device (30). The PVR is operable to receive an instruction to record content directly to the external storage device (30). The PVR determines if the external storage device (30) can store the media content at a required transfer rate. If the external storage device (30) is unable to store the media content at the required rate, it uses the internal storage device (24) to record the received media content and to transfer the stored media content from the internal storage device (24) to the external storage device (30). The achievable transfer rate can be determined once transfer has commenced.

10 Claims, 3 Drawing Sheets

U.S. PATENT DOCUMENTS

| | | |
|---|---|---|
| 7,290,698 B2 * | 11/2007 | Poslinski et al. ............ 235/375 |
| 7,526,184 B1 * | 4/2009 | Parkinen et al. ............... 386/83 |
| 2001/0036254 A1 * | 11/2001 | Davis et al. ................. 379/67.1 |
| 2002/0040475 A1 * | 4/2002 | Yap et al. ...................... 725/39 |
| 2002/0089928 A1 | 7/2002 | Morikawa et al. |
| 2002/0186957 A1 | 12/2002 | Yuen |
| 2003/0106072 A1 * | 6/2003 | Soundararajan ............ 725/151 |
| 2005/0019005 A1 * | 1/2005 | Kim ............................ 386/68 |
| 2005/0262322 A1 * | 11/2005 | Ma ............................ 711/165 |

FOREIGN PATENT DOCUMENTS

| | | |
|---|---|---|
| WO | WO0184834 | 11/2001 |
| WO | WO02104026 A1 | 12/2002 |

* cited by examiner

TRANSFER OF MEDIA CONTENT FROM A PERSONAL VIDEO RECORDER TO AN EXTERNAL STORAGE DEVICE

This invention relates to personal video recorders (PVR) which can transfer content to external storage devices.

Personal video recorders (PVR), also known as personal digital recorders (PDR) are becoming increasingly commonplace in the marketplace. Typically, these machines have an internal high-capacity storage device such as a hard disk which stores media content received from a broadcast channel. The use of a storage device of this kind can support playback manipulation features such as pause and rewind and can allow a user to watch the beginning of a recorded programme while the remainder of the programme is still being recorded 'off air'.

One limitation of a conventional PVR is that the storage is internal to the machine. It is known to provide a combined unit comprising a PVR and a recordable disk player such as a recordable Digital Versatile Disk (DVD) player such that a user can store content on a portable carrier which can be transferred between users. In this case the properties of the recordable player will be known to the PVR. It has also been proposed to provide an interface between a PVR and an external storage device, such as an external hard disk drive or solid state memory device, such that content can be transferred between users. Storage devices differ widely in their storage capabilities and it is possible that the external storage device, or the interface to the external device, has insufficient bandwidth to support transfer of the content that a user has requested. Under such circumstances, the PVR would require a device to abandon the recording and throw an exception to the application that made the recording request.

The present invention seeks to provide an improved way of transferring content between a PVR and an external storage device.

Accordingly, a first aspect of the present invention provides a controller for a personal video recorder (PVR), the PVR comprising a receiving stage which is operable to receive media content, an internal storage device for storing content and an interface for connecting to an external storage device, the controller being operable to:

receive an instruction to record content directly to the external storage device;

determine if the external storage device can store the media content at a required transfer rate;

and wherein if the external storage device is unable to store the media content at the required transfer rate, to use the internal storage device to record the received media content and to transfer the stored media content from the internal storage device to the external storage device.

Preferably, the controller initiates transfer of the received media content to the external storage device upon receiving the instruction and then determines, during the transfer, if the external storage device can store the media content at the required rate. This provides an accurate assessment of the transfer rate at the time transfer is required. This can be achieved by monitoring the rate at which the external storage device is able to accept the media content.

Preferably, if the external storage device is unable to store the media content at the required rate, the internal storage device is used as a recording buffer. The received media content is firstly recorded to the internal storage device and is then transferred from the internal storage device to the external storage device. It is preferred that the transfer from the internal storage device to the external storage device occurs while the internal storage device continues to record media content. This minimizes the overall transfer time and reduces the amount of space occupied on the internal storage device.

A further aspect of the invention provides a personal video recorder incorporating the controller. The term "personal video recorder" is intended to include personal digital recorders (PDR) and digital video recorders (DVR).

A still further aspect of the invention provides a method of transferring media content between a personal video recorder (PVR) and an external storage device, the PVR comprising a receiving stage which is operable to receive media content, an internal storage device for storing content and an interface for connecting to the external storage device, the method comprising:

receiving an instruction to record content directly to the external storage device;

determining if the external storage device can store the media content at a required transfer rate;

and wherein if the external storage device is unable to store the media content at the required transfer rate, using the internal storage device to record the received media content and transferring the stored media content from the internal storage device to the external storage device.

The functionality described here can be implemented in software, hardware or a combination of these. The invention can be implemented by means of hardware comprising several distinct elements, and by means of a suitably programmed processing platform. Accordingly, another aspect of the invention provides instructions (software) for causing a processor to implement the method. The instructions may be stored on an electronic memory device, hard disk, optical disk or other machine-readable storage medium. The software may be downloaded directly to the PVR via a network connection.

Embodiments of the present invention will now be described, by way of example only, with reference to the accompanying drawings, in which.

Figure 1:
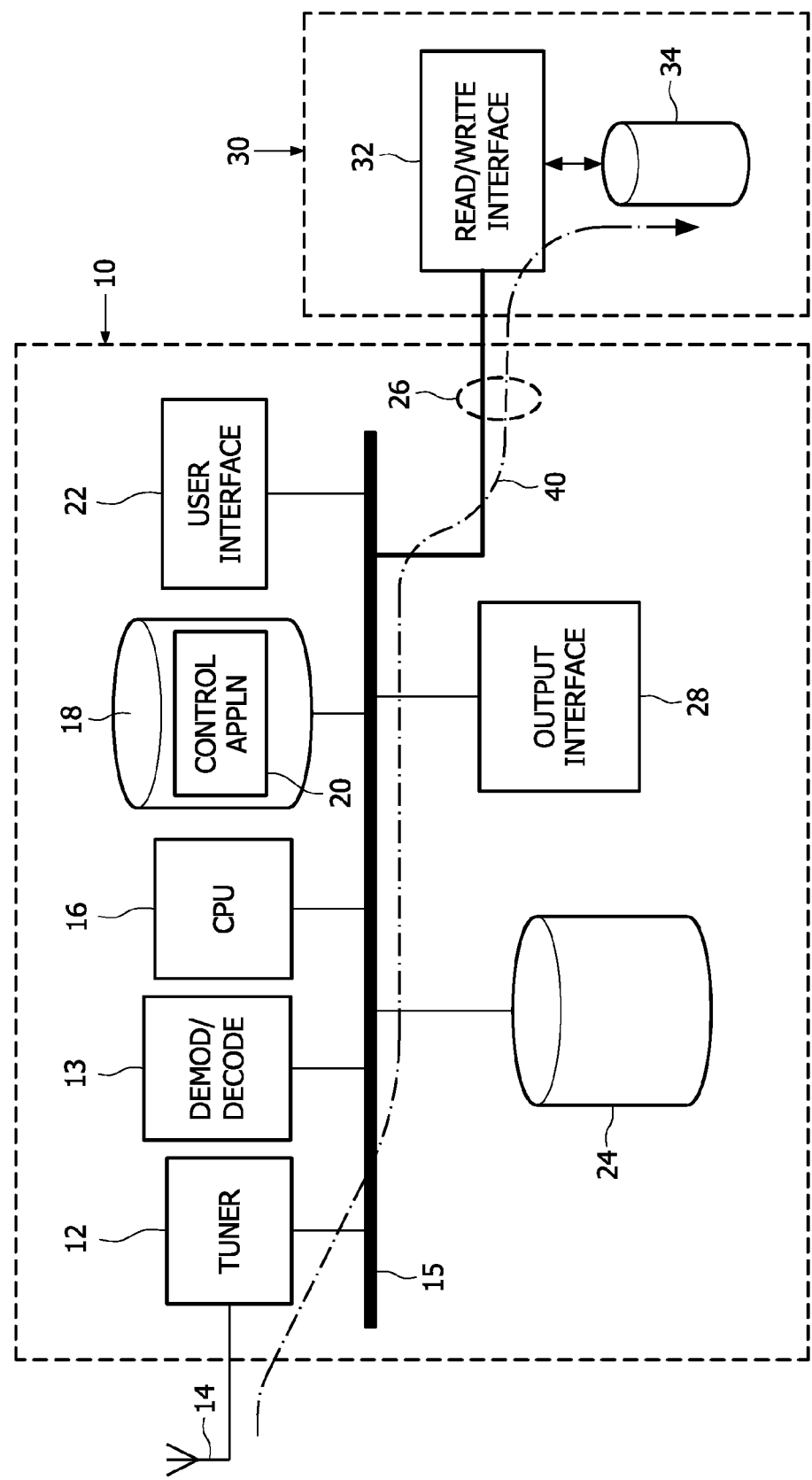
FIG. 1 shows a personal video recorder (PVR) operating in a mode for direct recording on an external storage device.

FIG. 1 schematically shows a Personal Video Recorder (PVR) or Personal Digital Recorder (PDR) 10. A central processing unit (CPU) 16 executes a control application 20 which resides in a memory 18. The CPU 16 and memory 18 are operatively connected via a common bus 15 that also operatively interconnects other PVR components, including a tuner 12, a user interface 22 and an internal storage device 24 such as a high-capacity hard drive. The internal storage device can be used to store content for later presentation and to provide, during normal viewing, a time shift buffer which supports various trick presentation modes such as pause, rewind etc.

Tuner 12 receives media content from an external source. FIG. 1 shows an antenna 14 receiving broadcast television channels. In general, the received media content can include audio/video content channels or streams which are received via a satellite, cable, terrestrial or an Internet Protocol (IP) based delivery medium. Tuner 12 is controllable to select a particular channel that a user wishes to view or record. The channel of interest can be selected by an input received from a user via the user interface 22 or by a selection previously stored in memory 18. A demodulator/decoder 13 demodulates and decodes a selected channel for viewing or reception.

An output interface 28 converts AV data into a suitable format for presentation by a television set and loudspeakers.

User interface 22 can take the form of an operating panel mounted on the PVR 10 or a remote control which has a graphical user interface (GUI) or which uses a television set to display user selectable options.

An interface 26 allows the PVR to be connected to an external storage device 30, such as an external hard-disk drive or solid-state memory card. The interface can comprise one or more of a Universal Serial Bus (USB), IEEE 1394 (FireWire) or Ethernet interface or a connector for a memory card such as a Compact Flash card. Interface 26 can also take the form of a wireless interface, such as one based on an IEEE 802.11 protocol or Bluetooth™, which delivers data to a portable storage device within range of the PVR.

In it's normal operating mode, the PVR 10 operates in a conventional manner and a received stream of media content is routed from the tuner 12 to both the output interface 28 and a time shift buffer (TSB) on internal storage device 24. Accordingly, when a user pauses live or real time television channel, the PVR freezes the frame at the output interface 28, while continuing to direct the AV data via bus 15 to the time-shift buffer on the internal storage device 24 so that the channel content may be stored.

In a mode of operation according to an embodiment of the invention a user can request the PVR 10 to record directly 'off-air' to an external storage device 30. The storage device 30 may be plugged, via a cable, to interface 26 or may have established a wireless connection with the PVR. The capabilities of external storage devices 30 can vary widely, in terms of their storage capacity and their maximum data transfer rate (bandwidth). This transfer rate will also depend on the type of read/write interface 32 of the storage device 30. The type of interface 26 being used to connect to the storage device 30 will also impose an upper limit on the data transfer rate. If a wireless connection is being used, then the maximum data rate available for transferring content between the PVR and storage device 30 will depend on the type of link, the quality of the wireless link (e.g. propagation conditions) and the number of other devices which are contending for access to the same spectrum. As an example, a Bluetooth™ link will deliver a much lower data rate than an IEEE 802.11 link. FIG. 1 shows a data flow 40 through the PVR in an ideal scenario where the interface 26 and storage device 30 are matched to the rate at which data is delivered to the storage device 30. The content is selected by the tuner 12, demodulated/decoded and repackaged into an appropriate format (if necessary) for transfer to the storage device 30.

Figure 2:
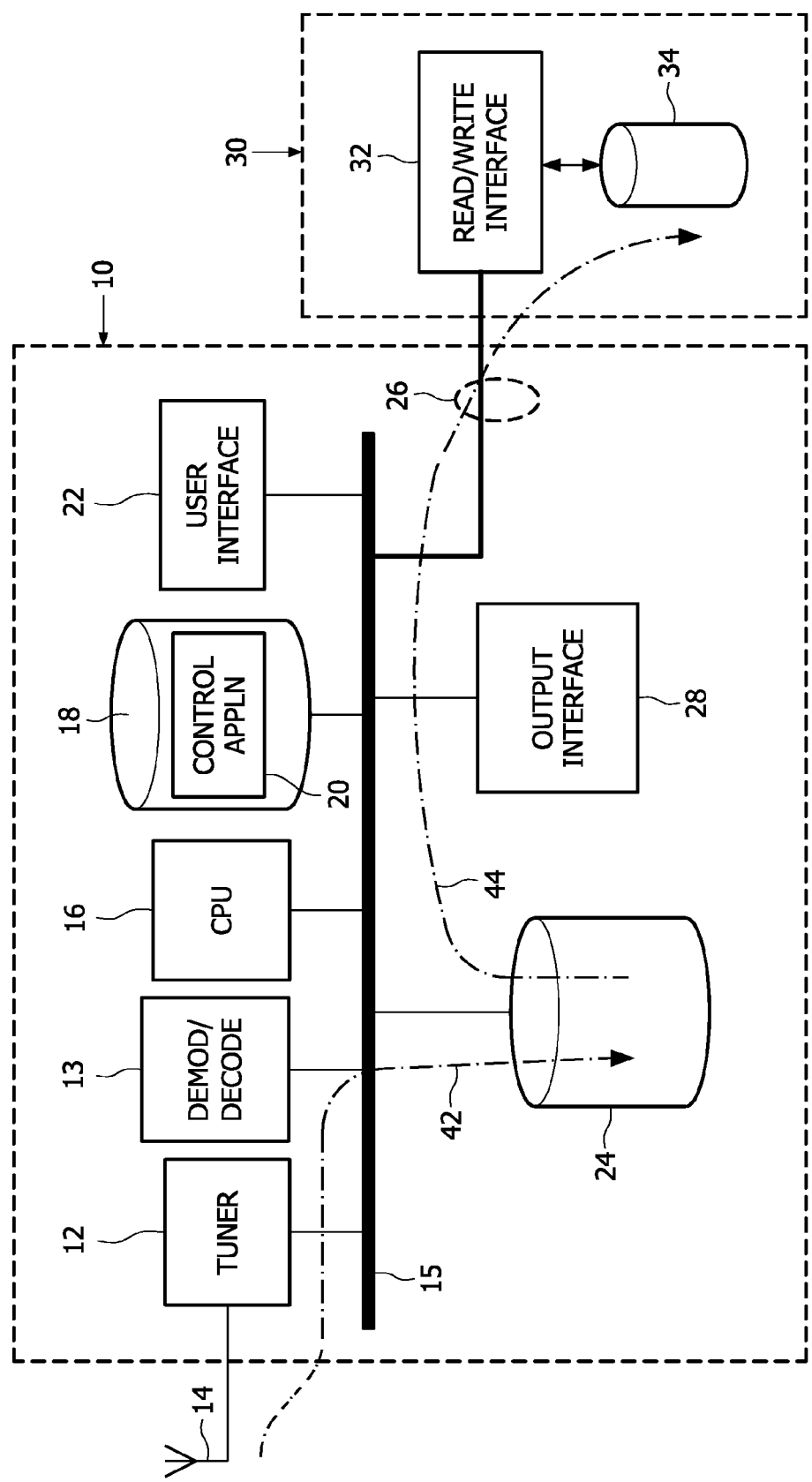
FIG. 2 shows the PVR of FIG. 1 operating in a mode where the internal storage device is used as a buffer.
Figure 3:
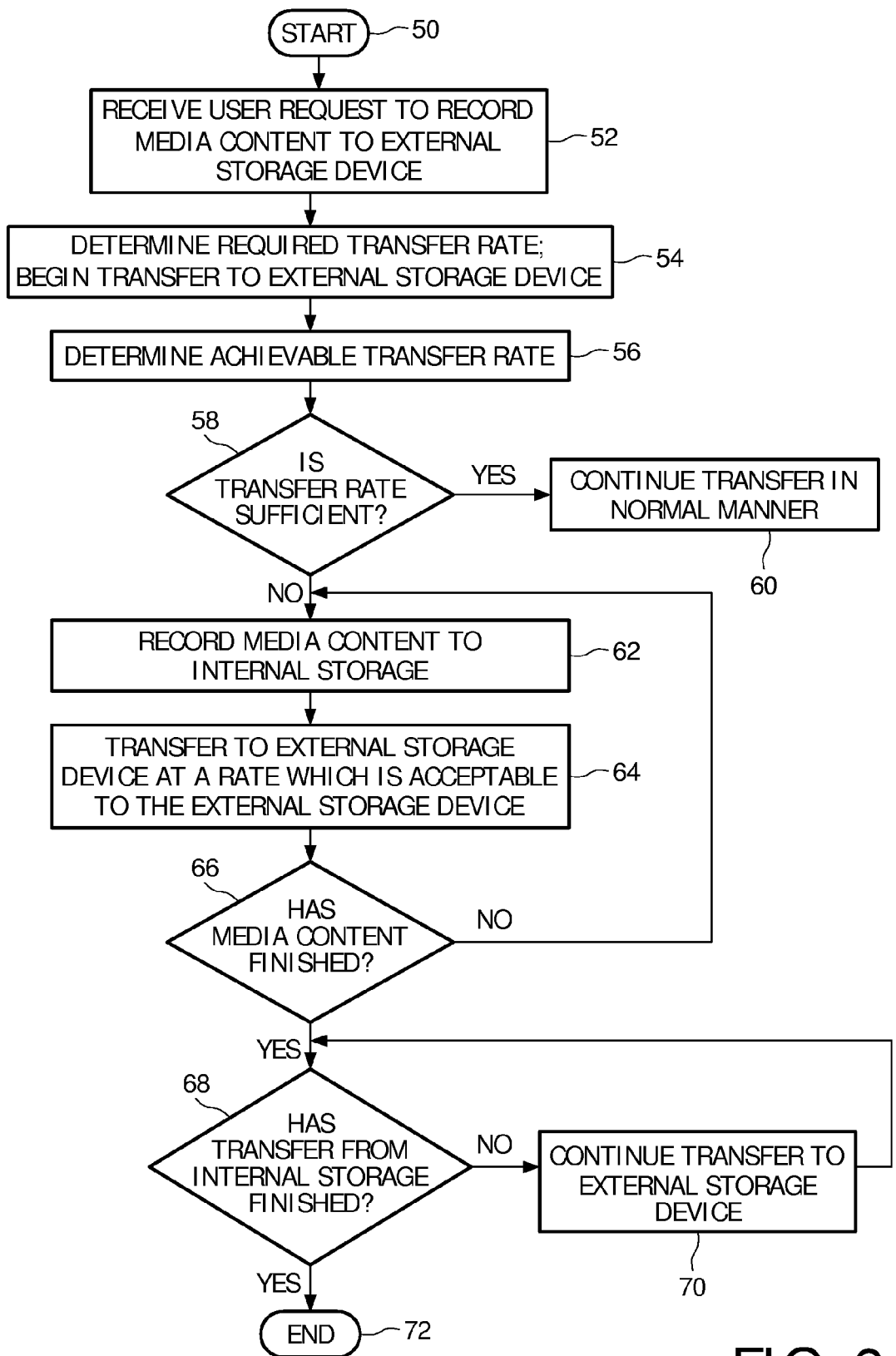
FIG. 3 shows a flow chart of the operating mode of FIG. 2.

FIG. 2 shows a data flow 42, 44 through the PVR in a scenario where the interface 26 and/or storage device 30 are not matched to the rate at which data is attempted to be delivered to the storage device 30. This is described in the flow chart of FIG. 3. Beginning at step 50, a request is received to record an AV stream directly to an external storage device 30 at step 52. The PVR begins to transfer data to the external storage device 30 at step 54. As part of this step the controller determines the transfer rate that is required to support transfer of the requested content. This can be derived from properties of the selected content stream such as the average bit rate of the stream. During the transfer, the control application 20 monitors (step 56) how quickly it is able to write the A/V stream to the external device 30. The transfer rate may be constant, or may vary during the course of transfer. At step 58 it is determined if the transfer rate is sufficiently high to accommodate transfer of the requested content streams. This determination is made by comparing the achievable transfer rate with the required transfer rate determined at step 54. If the achievable transfer rate is sufficient then the transfer continues as normal (step 60, flow 40 FIG. 1). However, if the transfer rate is not sufficiently high, remedial action is taken which begins at step 62. The direct streaming of AV data to the external storage device 30 is stopped and instead received AV data is streamed to the internal storage device 24 (flow 42, FIG. 2) where it is stored temporarily in a buffer. The changeover between streaming directly to the external storage device 30 and streaming to the internal storage device 24 occurs without loss of data. A new stream (flow 44, FIG. 2) is then created from the internal hard disk to the external storage device at step 64. This new flow is chosen to better match the transfer capabilities of the connection to the external storage device 30 and preferably is a transfer rate which does not exceed the available bandwidth of the connection to the external storage device 30.

Whilst the external storage device 30 is unable to provide the required bandwidth, the buffer on the internal storage device 24 will grow in size. Content is buffered on the internal storage device until the requested AV stream is complete (step 66). This may be prompted by a user terminating the recording of the stream or a timer event finishing. Once recording of the selected media content has terminated, the buffer on storage device 24 will begin to reduce in size until it is empty. Steps 68, 70 monitor for this event. The transfer rate used at step 64 for the newly created stream 44 between the internal and external storage devices can vary as the connection between the devices is able to provide more or less bandwidth, e.g. when another stream going to/from the external device finishes, the external device 30 will be able to receive data at a higher rate. By periodically monitoring the achievable transfer rate to the external storage device 30 it is possible to take advantage of any increase in the transfer capacity of the external storage device 30, thereby reducing the overall transfer time and the peak amount of data buffered in the internal storage device 24. The method ends at step 72 when all of the buffered data has been transferred to the external storage device 30.

In the method described above the transfer data rate is determined once transfer has begun. In general, it is difficult (or impossible) to determine the transfer bandwidth to an external device 30 in advance of the start of the transfer, and so it is difficult to determine whether or not the external device 30 will be able to accept transfer of the requested AV content. One reason why it is difficult is because there is no standardized way to ask the external device 30 what bandwidth it offers. Where information about the transfer rate capabilities of an external device is known to the PVR in advance of commencement of the transfer, the PVR can use this information to decide whether the external storage device 30 will be able to support a direct recording (40, FIG. 1) or whether the PVR should begin the transfer process in the manner shown in FIG. 2. If the maximum transfer rate is below that required for transfer of the selected content, then the PVR should begin to record to the internal storage device 24 at the start of the transfer.

It is possible to test the available bandwidth before commencement of transfer, such as when the external storage device is first connected to the PVR. However, this may be unreliable. If the external device 30 is a hard disk, then the disk spins at a constant rotational speed. When writing at the edge of the disk (where the linear speed of the disk is greater) the bandwidth available is greater than the bandwidth when writing at the middle of the disk (where the linear speed of the disk is less). Also, if the external device 30 is a hard disk, then when writing to different areas of the disk (e.g. when storing multiple streams) the disk must waste some time "seeking"— moving the read/write heads from one part of the disk to another. The time taken for this depends on the distance to move, as well as the design of the hard disk. This inefficiency may lower the total bandwidth of the device. In view of the above, it is preferable to monitor the transfer rate during transfer.

In the method described above buffered data is streamed to the external storage device 30 at the earliest opportunity. This has the benefit of minimizing the portion of the internal storage device used to buffer data, and reduces the time to transfer the data to the external storage device. In an alternative, less preferable, embodiment the PVR can always store the received data in it's entirety on the internal storage device 24 before commencing transfer to the external storage device 30.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in the claim. Where the system/device/apparatus claims recite several means, several of these means can be embodied by one and the same item of hardware.

In the description above, and with reference to the Figures, there is described a personal video recorder (PVR) 10 which comprises a receiving stage 12 which receives media content and an internal storage device 24 such as a hard-disk. The PVR has an interface 26 for connecting to an external storage device 30. The PVR is operable to receive an instruction to record content directly to the external storage device 30. The PVR determines if the external storage device 30 can store the media content at a required transfer rate. If the external storage device 30 is unable to store the media content at the required rate, it uses the internal storage device 24 to record the received media content and to transfer the stored media content from the internal storage device 24 to the external storage device 30. The achievable transfer rate can be determined once transfer has commenced.

The invention claimed is:

1. A controller (20) for a personal video recorder (PVR) (10), the PVR comprising a receiving stage (12) which is operable to receive media content, an internal storage device (24) for storing content and an interface (26) for connecting to an external storage device (30), the controller being operable to:
   receive an instruction to record content directly to the external storage device (30);
   determine if the external storage device (30) can store the media content at a required transfer rate; and
   cause the PVR to record the received media content firstly to the internal storage device (24) and to transfer recorded media content from the internal storage device (24) to the external storage device (30) while continuing to record received content to the internal storage device (24) if the external storage device (30) is unable to store the media content at the required transfer rate.

2. The controller according to claim 1 which is operable to initiate transfer of the received media content to the external storage device (30) upon receiving the instruction and to determine, during the transfer, if the external storage device (30) can store the media content at the required transfer rate.

3. The controller according to claim 2 which is operable to monitor the rate at which the external storage device (30) is able to write the media content.

4. The controller according to claim 1 which is operable to transfer recorded media content from the internal storage device (24) to the external storage device (30) at a rate which is matched to the transfer capabilities of the external storage device (30).

5. The controller according to claim 4 wherein the transfer capabilities of the external storage device (30) are periodically assessed during the transfer of recorded media content from the internal storage device (24) to the external storage device (30).

6. The controller according to claim 1 wherein the external storage device (30) is one of: a hard disk storage device and a solid state memory device.

7. The controller according to claim 1 wherein the interface is a wireless interface.

8. The controller (20) according to claim 1 wherein the controller is incorporated within the personal video recorder.

9. A method of transferring media content between a personal video recorder (PVR) (10) and an external storage device (30), the PVR comprising a receiving stage (12) which is operable to receive media content, an internal storage device (24) for storing content and an interface (26) for connecting to the external storage device (30), the method comprising:
   receiving an instruction to record content directly to the external storage device (30);
   determining if the external storage device (30) can store the media content at a required transfer rate; and
   recording the received media content firstly to the internal storage device (24) and transferring recorded media content from the internal storage device (24) to the external storage device (30) while continuing to record received content to the internal storage device (24) if the external storage device (30) is unable to store the media content at the required transfer rate.

10. A machine readable storage medium having stored thereon instructions which when executed cause a processor to perform the method of claim 9.

* * * * *